Feb. 19, 1946.　　H. M. STOLLER　　2,395,080
SPEED CONTROL FOR MOTORS
Filed June 28, 1941
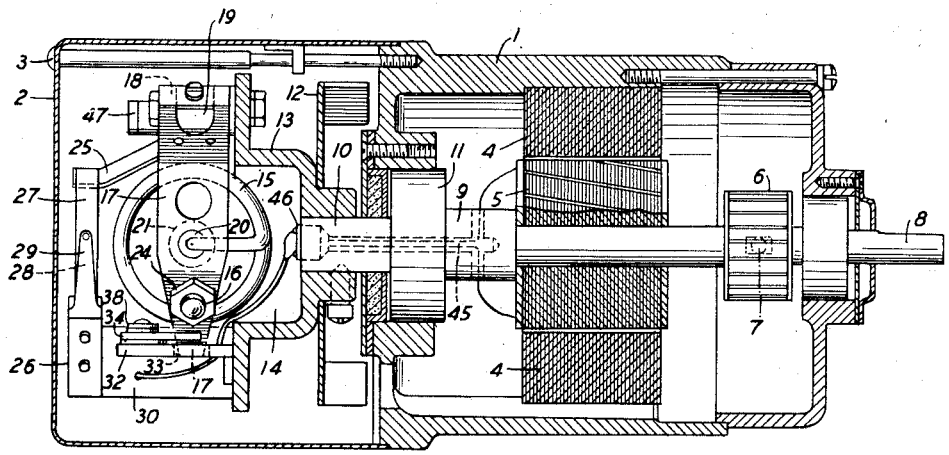
FIG. 1
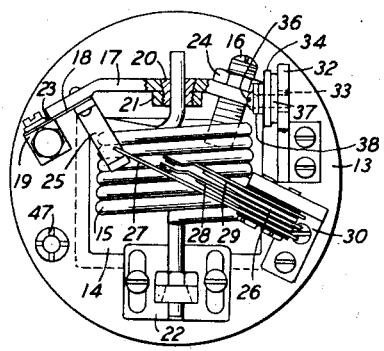
FIG. 2
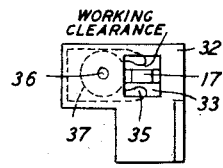
FIG. 2A
FIG. 4
DAMPING MATERIAL
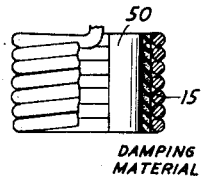
FIG. 3
BRAKING WINDINGS
ARMATURE WINDINGS
INVENTOR
H. M. STOLLER
BY
H. A. Burgess
ATTORNEY Patented Feb. 19, 1946

2,395,080

UNITED STATES PATENT OFFICE 2,395,080

SPEED CONTROL FOR MOTORS

Hugh M. Stoller, Mountain Lakes, N. J., assignor to Bell Telephone Laboratories, Incorporated, New York, N. Y., a corporation of New York Application June 28, 1941, Serial No. 400,247

8 Claims. (Cl. 171—222)

The present invention relates to speed control of a dynamo-electric machine and has for its object the maintenance of substantially constant speed of, for example, an electric motor under varying operating conditions.

The embodiment of the invention to be specifically disclosed herein was developed in response to a need for a small motor that would have good starting torque and that would run at constant high speed under such adverse conditions as variable load, variable voltage supply, variable temperature and when subjected to vibration. A further requirement was small weight and space together with simple and rugged construction.

In its general features, the embodiment to be more specifically disclosed hereinafter comprises a series wound motor with a mechanical governor controlling contacts which open and close as the governor arm vibrates in response to variations from normal speed. These contacts open and close circuits through braking windings on the motor armature, thereby varying the load on the motor. The embodiment to be disclosed contains certain features, provided in accordance with the invention, which together result in a reliability and degree of precision believed to be distinctly new in the art, as will be more fully pointed out.

The nature of the invention and its objects and features will appear more fully from the following detail description and from the accompanying drawing, in which:

Fig. 1 is a longitudinal view, partly sectional, of the assembly of the motor and governor, according to the invention;

Fig. 2 is a view in elevation of the governor as seen from the left in Fig. 1 when the cover plate is removed;

Fig. 2A is a fragmentary view showing the damping mechanism as seen from the right in Fig. 2;

Fig. 3 is a circuit diagram of the motor and braking windings with their control contacts; and Fig. 4 shows damping means applied to the governor restraining spring.

In Fig. 1 the motor housing is shown at 1 and the cover for the governor is at 2 with screws 3 for securing the cover to the motor housing. The two poles are shown at 4, armature at 5, commutator at 6 and the position of one of the two opposite brushes is shown at 7, these being in a line at right angles to the center line of the poles. The motor shaft 8 is enlarged at 9 and 10 for extra strength and is provided with a rugged ball bearing 11. The projecting end 10 of the shaft carries a fan 12 and a face plate or rotating head 13 which supports the governor. Face plate 13 has a rectangular recess 14 seen also in Fig. 2 for accommodating the coil spring 15 of the governor.

The governor proper comprises a weight 16, in the form of an adjustable screw, carried on an arm 17 which is hinged by a reed 18 to the post 19 on the face plate 13, and a restraining coil spring 15 for the arm 17. The upper end of spring 15 passes through the arm 17 and has a collet 20 in a tapered hole in arm 17 so that as the collet is drawn down by nut 21 it grips the end of the spring securely against the arm 17. The opposite end of spring 15 is similarly secured in a bracket 22 provided with slots so that it may be moved for adjusting the spring tension. The governor weight 16 in the form of a screw is set at an angle to permit accurate adjustment of the radial distance of the center of mass of the governor arm and weight from the shaft center. The adjustment is held, when once made, by lock nut 24.

The governor arm 17 has a lever arm 25 for operating the spring pile-up 26 comprising the relatively long spring 27 and the short springs 28, 29. The spring pile-up is mounted on bracket 30 on face plate 13. The lever arm 25 has a bent end reaching underneath the free end of spring 27 so that as the governor arm is thrown outwardly by centrifugal force against the tension of spring 15 the contact springs 27, 28 and 28, 29 are closed in succession.

The free end of arm 17 is bent back to horizontal (as seen in Fig. 2) and passes through an aperture 33 in bracket 32 secured on face plate 13. Excessive motion of the free end of the arm 17 is prevented by the damping member 34 which has fingers 35 reaching over arm 17 in position to be engaged by the arm when its movement exceeds a predetermined amount. Damping plate 34 is of aluminum and rotates around pin 36 which has a friction washer such as fiber washer 37 which together with plate 34 is loosely mounted between washers 38 and the face of bracket 32 to apply a controlled amount of friction to the plate 34 when the assembly rotates. Mechanical features of the governor including this damping feature are disclosed and claimed in a copending application of E. R. Morton, Serial No. 400,299, filed June 28, 1941.

While the form of damping means shown in Fig. 2A in which the damper acts upon the arm 17 in the manner disclosed is preferred, another type of damping means that applicant has found effective is shown in Fig. 4, applied directly to the spring 15. This comprises a sheet 50 of rubber or Biscaloid laid up against the inner surface of the spring. Centrifugal force presses this sheet firmly against the coil and forces it into the spaces between the turns of the coil when the coil is rotating and distended. The sheet need not extend more than a fraction of the way around inside the coil 15.

It is thought that the general operation of the mechanical features of the governor will be evident from the above description. It will be clear that governor arm 17 is moved outwardly by centrifugal force against the tension of the restraining spring 15 as the motor speeds up and that contact springs 27, 28 and 29 are separated until normal speed is attained and slightly exceeded whereupon lever arm 25 in engagement with spring 27 closes first contact springs 27 and 28 and then, with further movement, springs 28 and 29. The circuits closed in this way, to be described presently, load the armature sufficiently to slow the motor down until the springs are separated, and in practice the springs are continually opening and closing to maintain substantially constant speed.

The braking windings controlled by the contact springs are shown in Fig. 3 at 41 and 42. The field coils are shown at 39 and 40 and the armature at 5. The normal armature windings are shown at 49. When contact 28' (representing the contact between springs 27 and 28) is closed it short-circuits resistance 43 normally in shunt with winding 41. When contact 29' (representing the contact made by springs 28 and 29) is closed it short-circuits the resistance 44 normally in shunt with winding 42. The resistances 43, 44 may be mounted at a suitable point on the head 13, such as at 47.

In one example constructed and successfully used the terminal voltage was nominally 24 volts, winding 42 had a resistance of 19 ohms and winding 41 had a resistance of 31 ohms, resistance 44 was 200 ohms and resistance 43 was 100 ohms. The armature had 12 slots with the primary winding wound 64 conductors per slot, of No. 23 enamelled wire. The secondary or braking windings consisted of 192 turns of a pair of No. 35 for winding 42 and No. 33 for winding 41 enamelled wire parallel wound. One end of each of these two parallel wires was grounded on the shaft and the other ends were pulled through the bore in the shaft shown at 45 in Fig. 1 and brought out to connecting block 46 from which they were carried across to the contact springs and resistances 43, 44 on revolving head 13.

It is seen, therefore, that as the motor speed increases, the contact 28' which closes first operates on a 31-ohm resistance winding (41) while the contact (29') which closes later operates on a 19-ohm winding (42).

In this manner the sparking is minimized since the heavier current winding is broken only when the associated higher resistance winding is short-circuited. Thus, what would normally constitute an inductive discharge at the contact points is absorbed by the closely coupled closed circuit. The short-circuiting of the secondary armature windings causes electrical losses in these windings, thereby throwing a load on the motor and causing the speed to fall. The restraining spring then overcomes the centrifugal force and causes the contacts to be opened after which the sequence is repeated. The frequency of this vibration in one case was approximately 30 cycles per second. This frequency is entirely independent of the rotation frequency of the motor and out of synchronism with it so that closure of the contacts may occur at any point in the cycle of the electromotive force induced in the secondary armature windings 41 and 42.

The use of the flexible contact springs as disclosed in Fig. 2 also contributes in an important manner to the reduction of sparking at the contacts. The contacts are not immediately separated at the initial movement of the governor arm since each of the shorter springs follows the longer springs for a certain distance before the contacts open. This insures that the governor arm has already attained a finite velocity before the contacts separate. The contact pressure drops from full pressure to zero instantly after which the contacts separate rapidly and this minimizes sparking. This action is in marked contrast to that of the conventional type of centrifugal governor in which the contacts are rigid and, therefore, the contact pressure falls off at a relatively gradual rate to zero at the instant of break, while the velocity of separation of the contacts is also zero at the first instant after break.

The superiority of flexible contacts with sinusoidal motion as compared with rigid contacts with intermittent motion has of itself been recognized but attempts to use such flexible contacts in governors heretofore have resulted in instability. The construction disclosed herein in which the flexible contact springs are incorporated together with an effective damping means has proved highly successful.

The spring 15 should be made of an alloy having a substantially zero temperature coefficient of elasticity where the motor is to operate under varying temperature conditions. In the motor referred to, constructed and successfully used, the governor held the speed within ±2 revolutions per minute in the case of a 3600 R. P. M. motor. This regulation was maintained under varying load conditions at constant voltage or under voltages from 20 to 28 volts at constant load. The governor gave substantially constant speed control over a temperature range —50° F. to +160° F.

What is claimed is:

1. In combination with an electric motor, a mechanical governor therefor, a pair of closely coupled braking windings on the motor armature, pairs of contacts adapted to be closed in succession by action of the governor, one pair of contacts adapted for closing upon initial governor action in response to increase in speed above normal and when closed, closing a circuit through one of said windings, the other pair of contacts adapted to be closed upon further governor action in response to further increase in speed and, when closed, closing a circuit through said second winding, said second winding having greater braking effect than said first winding.

2. In a speed regulator for an electric motor, a pair of closely coupled windings on the motor armature, comprising a high resistance winding and a low resistance winding, speed responsive contact means operating in response to an initial increase in speed above normal for closing a circuit including said high resistance winding, and speed responsive contact means operating in response to a further increase in speed for closing a circuit including said low resistance winding.

3. In a speed regulator for an electric motor, a pair of closely coupled windings on the motor armature, one having higher resistance than the other, an external resistance connected across the terminals of each winding whereby said windings have negligibly small braking effect, and speed responsive means, contacts controlled thereby, said means operating contacts to short-circuit the external resistance connected across the high resistance winding in response to a slight increase in speed above normal, said means operating contacts to short-circuit the external resistance connected across said low resistance winding in response to a further increase in speed.

4. The combination with a series wound motor of a speed regulating governor driven thereby and comprising electrical contacts arranged to be closed in succession in response to increase in motor speed, a pair of closely coupled braking windings on the armature normally terminating in resistances, one of said windings being of higher resistance than the other, said contacts arranged to short-circuit the respective braking windings when closed, the contacts that close first in response to increasing motor speed short-circuiting the higher resistance winding.

5. The combination with a series wound motor of a pair of braking windings rotatable with the armature, comprising a pair of wires of differing resistivity parallel wound to provide close coupling, thereby providing a high resistance winding and a low resistance winding, a mechanical governor, contacts closed thereby upon rotation above normal speed, said contacts closing in given sequence in response to increasing speed, the contact first to close in response to increasing speed acting to short-circuit the higher resistance winding, the contact next to close in response to increasing speed acting to short-circuit the lower resistance winding.

6. In combination with an electric motor having an armature, a pair of braking windings comprised of different gauge wire parallel wound to provide closely coupled windings of respectively different resistance, a resistance connected across each winding, and speed responsive contacts constructed and arranged to cut out said resistances in succession as the motor speed increases above normal and to reinsert said resistances in reverse order as the speed is restored to normal, the contact first to close with increasing motor speed and last to open with falling motor speed being the contact connected to the resistance across the higher resistance winding.

7. A speed regulator for an electric motor having an armature, a plurality of braking windings on said armature, a spring restrained centrifugal governor having a rapidly vibrating governor arm, contacts actuated by said arm in vibrating, said contacts positioned to be closed individually by movement of said arm to different extents from normal, and circuits including said windings controlled by said respective contacts.

8. In a speed regulator for a motor having a rotating armature, a pair of parallel wound closely coupled windings on said armature, one winding having higher resistance than the other, a speed responsive contact for opening and closing a circuit including the low resistance winding for effectively braking the motor, and a second contact mechanically joined to the first-mentioned contact and operating in conjunction therewith to short-circuit the high resistance winding before the circuit is closed by the first contact through the low resistance winding and to maintain the short-circuit on the high resistance winding until after the opening of said circuit through the low resistance winding, to reduce sparking at the first-mentioned contact.

HUGH M. STOLLER.